No. 784,732. PATENTED MAR. 14, 1905.
R. N. CHAMBERLAIN.
SYSTEM OF ELECTRICAL DISTRIBUTION.
APPLICATION FILED JUNE 12, 1903.
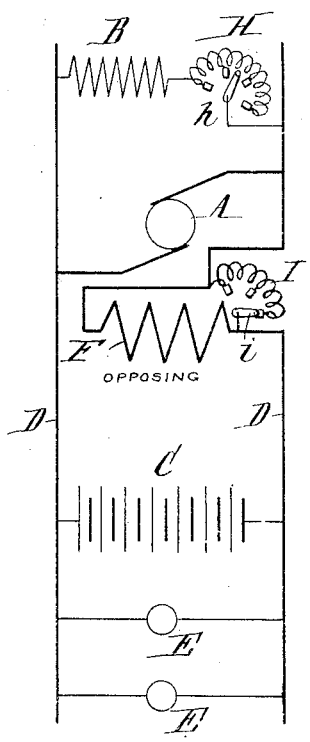
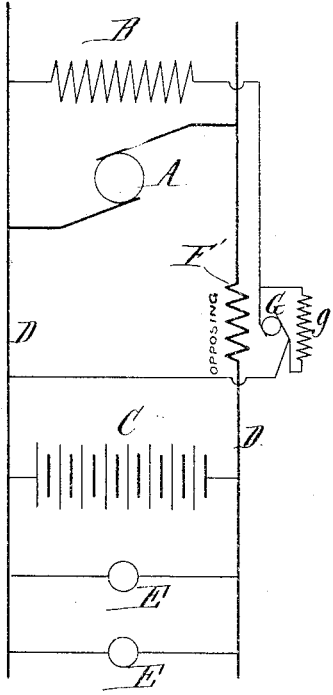
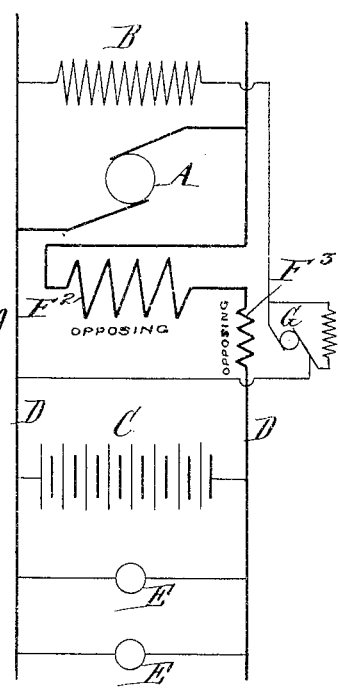

No. 784,732.

Patented March 14, 1905.

UNITED STATES PATENT OFFICE.

RUFUS N. CHAMBERLAIN, OF DEPEW, NEW YORK, ASSIGNOR TO GOULD STORAGE BATTERY COMPANY, OF NEW YORK, N. Y., A CORPORATION OF WEST VIRGINIA.

SYSTEM OF ELECTRICAL DISTRIBUTION.

SPECIFICATION forming part of Letters Patent No. 784,732, dated March 14, 1905.

Application filed June 12, 1903. Serial No. 161,160.

*To all whom it may concern:*

Be it known that I, RUFUS N. CHAMBERLAIN, a citizen of the United States, and a resident of Depew, in the county of Erie and State of New York, have invented a new and useful Improvement in Systems of Electrical Distribution, of which the following is a specification.

In power-stations, especially when the load varies considerably, it has been the common practice to arrange a storage battery in the system for the purpose of producing a nearly constant load on the generator by furnishing the required additional current when the load exceeds the generator capacity and by absorbing the excess of the generated current when the load is below the generator capacity. As the potential is between 2 and 1.7 volts in a discharging-cell and from 2.3 to 2.7 volts and higher in a charging-cell, according to the state of charge in the battery and the ampere rate, it is necessary to apply a potential-regulator, commonly called a "booster," in the battery-circuit. This booster is required to generate an additional electromotive force of such magnitude that the battery will be charging at a rate which is practically equal to the existing excess of the generator capacity when the load is below the same; but when the load exceeds the generator capacity the booster should generate either no electromotive force or else generate a counter electromotive force of such magnitude as to cause the battery to discharge at a rate which equals the excess of the load over the generator capacity. The booster is usually an ordinary shunt-generator provided with a series magnet-coil, which is connected with the feeding or load line and opposes the shunt magnetic effect when a current is passing through the coil. One of several well-known booster systems is that of Letters Patent No. 651,664, June 12, 1900, to A. S. Hubbard, which requires two or more electric generators in addition to the main generator.

The object of this invention is to accomplish the desired regulation more certainly and in a simpler manner, and to that end a series coil is provided in the main or load circuit in such a way that it opposes the magnetic effect of the shunt-coil in the magnetic field of the main dynamo or generator when current is passing through the main circuit.

When there is no load on the main circuit, the generator-magnet will be fully excited, the dynamo generates to its full capacity, and the electromotive force is of such magnitude that the batteries will be charging. If there is a load on the main circuit, the effect of the field-magnet of the generator will be decreased by the opposing action of the series coil, the generator produces less electromotive force in ratio to the load, and correspondingly decreases the charging-current passing through the battery. When the load equals the generator capacity, the battery should be in a substantially neutral state. When the load exceeds the generator capacity, the generator voltage will be decreased to such an extent that the battery will be compelled to furnish the balance of current required over the generator-capacity. If the ratios and adjustments are proper, the main generator will produce a practically constant wattage under varying loads.

My invention contemplates various arrangements for automatically controlling the exciting field-coil, and in order to clearly demonstrate the susceptibility of any one illustration of my invention to modification I have in the accompanying drawings shown several embodiments of the same.

In the accompanying drawings, Figure 1 is a diagrammatic view illustrating the straight system or arrangement in which the series coil acts directly upon the exciting-coil. Fig. 2 is a similar view showing the series coil arranged to act upon a small auxiliary dynamo which produces the variation in the exciting-coil of the main dynamo. Fig. 3 is a similar view showing a combination of both arrangements.

Like letters of reference refer to like parts in the several figures.

A represents the main generator, which is operated at a practically uniform speed, as is usual in power-stations.

B represents the exciting field-coil of the dynamo; C, the storage battery; D, the consumption-circuit, and E the motors or other load. In the straight or direct arrangement (represented in Fig. 1) the series coil F, which opposes the magnetic effect of the exciting field-coil B, is arranged in the generator so as to act directly upon the exciting-coil. In the indirect arrangement (represented in Fig. 2) the series coil F' is arranged outside of the main generator and in a small auxiliary dynamo G, which has its magnetic coil $g$ connected with the exciting-coil B of the main generator and produces the desired magnetic variations therein. This arrangement can be employed when there is no space available in the main generator for accommodating the series coil F.

The described direct arrangement can be combined with the described indirect arrangement, as shown in Fig. 3. In this arrangement two series coils $F^2$ and $F^3$ are employed, the main coil $F^2$ being arranged in the main generator and the auxiliary coil $F^3$ in the auxiliary dynamo G. This combined arrangement can be employed when the space available in the main generator for the series coil is not quite sufficient to receive a coil of the required extent and part of the coil is required to be arranged outside of the main generator.

In many cases it is desirable to regulate the action of the exciting-coil and the series coil upon each other. This can be readily done, as indicated in Fig. 1, by arranging in connection with the exciting-coil B a resistance H, which is regulated by a switch $h$, and in connection with the series coil F a resistance I, which is regulated by a switch $i$.

The opposing or demagnetizing series coil is so proportioned with reference to the exciting or magnetizing coil that the magnetizing or exciting effect of the latter is several times greater than the opposing or demagnetizing effect of the series coil, or, in other words, that the demagnetizing effect of the series coil equals but a small fraction of the magnetizing effect of the exciting-coil. These coils may be so proportioned that the demagnetizing effect of the series coil is equal to about five per cent. of the exciting effect of the field-coil; but variations in these proportions are of course permissible. The effect of the opposing series coil is mainly utilized for accentuating the drop of voltage which is inherent in a shunt-dynamo under an increase of load.

I claim as my invention—

An electrical-power-regulating system comprising a dynamo which is operated at a practically uniform speed, a consumption-circuit supplied from the dynamo, a storage battery connected with said circuit, an exciting-coil for the dynamo, and an opposing series coil in the consumption-circuit, which series coil is several times smaller in effect than said exciting-coil, whereby the differential action of the coils produces a practically constant load on the generator under varying conditions of load on the consumption-circuit and at a practically uniform dynamo speed, substantially as set forth.

Witness my hand this 6th day of June, 1903.

RUFUS N. CHAMBERLAIN.

Witnesses:
EDWARD WILHELM,
C. B. HORNBECK.